United States Patent [19]
Choi

[11] Patent Number: 5,787,058
[45] Date of Patent: Jul. 28, 1998

[54] OPTICAL PICKUP APPARATUS UTILIZING A POLYGONAL PRISM

[75] Inventor: Yang-Oh Choi, Seoul, Rep. of Korea

[73] Assignee: Daewoo Electronics Co., Ltd., Rep. of Korea

[21] Appl. No.: 655,445

[22] Filed: May 30, 1996

[30] Foreign Application Priority Data

May 31, 1995 [KR] Rep. of Korea ............ 1995 14152
May 31, 1995 [KR] Rep. of Korea ............ 1995 14151

[51] Int. Cl.$^6$ ........................................... G11B 7/135
[52] U.S. Cl. .............................. 369/44.23; 369/44.12; 369/112
[58] Field of Search .................. 369/44.12, 44.23, 369/44.14, 112; 250/201.5

[56] References Cited

U.S. PATENT DOCUMENTS

| | | | |
|---|---|---|---|
| 4,684,799 | 8/1987 | Emoto et al. | 250/201 |
| 4,733,067 | 3/1988 | Oinoue et al. | 250/216 |
| 4,767,921 | 8/1988 | Kawasaki et al. | 250/201 |
| 4,778,984 | 10/1988 | Nakamura | 250/201 |
| 4,817,072 | 3/1989 | Toide et al. | 369/44.12 |
| 4,823,331 | 4/1989 | Yoshitoshi et al. | 369/44.12 |
| 4,862,446 | 8/1989 | Maeda | 369/112 |
| 4,868,377 | 9/1989 | Nishikawa | 250/201 |
| 4,870,632 | 9/1989 | Shiono et al. | 369/44.23 |
| 4,973,886 | 11/1990 | Hasson et al. | 315/324 |
| 5,073,888 | 12/1991 | Takahashi et al. | 369/112 |
| 5,134,604 | 7/1992 | Nagashima | 369/94 |
| 5,396,061 | 3/1995 | Taniguchi et al. | 369/112 |
| 5,446,565 | 8/1995 | Komma et al. | 359/19 |

FOREIGN PATENT DOCUMENTS

| | | |
|---|---|---|
| 0 283 002 | 3/1988 | European Pat. Off. |
| 0 301 792 | 7/1988 | European Pat. Off. |
| 0 401 764 | 6/1990 | European Pat. Off. |
| 0 543 481 | 7/1992 | European Pat. Off. |
| 0 550 036 | 12/1992 | European Pat. Off. |

Primary Examiner—Thang V. Tran

[57] ABSTRACT

Disclosed is an optical pickup apparatus being manufactured with ease and utilizing the intensity of a laser beam effectively. The optical pickup apparatus comprises a polygonal prism having an upper surface, an incline surface, and a bottom surface. A laser beam emitted from laser source is reflected by the incline surface of the prism and is converged on an optical disc. Then, the reflected laser beam reflected by the optical disc is transmitted through the incline surface of the prism and is reflected by a Fresnel lens at the bottom surface of the prism and finally is focused on the photodetector. The optical pickup apparatus records and reproduces information on and from the optical disc and performs as a focusing servo and a tracking servo of the objective lens by utilizing data of the reflected information beam received by the photodetector.

10 Claims, 3 Drawing Sheets

OPTICAL PICKUP APPARATUS UTILIZING A POLYGONAL PRISM

BACKGROUND OF THE INVENTION

1. Field of the Invention

The present invention relates to an optical pickup apparatus, more particularly to an optical pickup apparatus for recording/reproducing information on/from an optical disc on a compact disc player, a laser vision disc player, or like.

2. Description of the Prior Art

In general, an optical pickup apparatus records and reproduces information on and from an optical disc by converging optical beams on the optical disc.

When the optical pickup apparatus records information on an optical disc, an optical beam radiated from a semiconductor laser is focused on an information recording surface of the optical disc as a shape of beam spots and elevates the temperature of the information recording surface up to the Curie point. Then, the information recording surface loses the coercive force and is magnetized so as to correspond to the given external magnetic field. Thereafter, the radiation of the optical beam is stopped and the external magnetic field is maintained as it is, and the temperature of the information recording surface is lowered. When the temperature comes down under the Curie point, the magnetized information recording surface is maintained as it is even though the external magnetic field is changed so that the recording of the information is completed.

When the optical pickup apparatus reproduces information from an optical disc, the semiconductor laser radiates an optical beam at a temperature below the Curie point onto the information recording surface of the optical disc. Then, the information recording surface has a Kerr effect, or magneto-optical effect, on the focused optical beam, so that the polarizing plane of the optical beam is rotated at an angle depending upon the magnetized state of the information recording surface. The optical pickup apparatus reproduces the information on the optical disc by detecting the magnetized state of the information recording surface based on the rotated angle of the polarizing plane.

An optical disc has an information track formed thereon in concentric or spiral shape at an interval of about 1.6 micrometer. The optical pickup apparatus records/reproduces data on/from a predetermined position of an optical disc by means of the information track. Therefore, the optical pickup apparatus performs focusing servo and tracking servo in order to exactly record and reproduce data on and from the optical disc. That is, the optical pickup apparatus controls the optical beam to be focused on the information track and to precisely follow it. Accordingly, the optical pickup apparatus detects servo error signals including focusing error signal and tracking error signal, and an objective lens actuator adjusts an objective lens along the focusing and tracking direction based on the detected servo error signals.

FIG. 1 is a schematic constructional view of a conventional optical pickup 10 for an optical disc player as described above.

As shown in FIG. 1, an optical pickup apparatus 10 of an optical disc player which is used in general includes a first semiconductor substrate 4 having a predetermined shape and size. A second semiconductor substrate 4a is arranged on a upper portion of first semiconductor substrate 4, and on the center of the upper surface of the second semiconductor substrate 4a a semiconductor laser 1 radiating laser beams is mounted.

Also, a polygonal prism 2 is arranged at a predetermined interval apart from semiconductor laser 1 on another upper portion of first semiconductor substrate 4. Photodetectors 3 and 3a are disposed on a boundary surface between the bottom of prism 2 and the upper surface of first semiconductor substrate 4, which change the intensity of a laser beam modulated and reflected by the optical disc.

Further, an objective lens 5 is disposed apart from an incline surface 7 of prism 2 at a predetermined interval.

In the optical pickup apparatus according to prior art which has the above construction, the semiconductor laser 1 emits a laser beam having a vibration wavelength of 780 nm±20 nm. The laser beam emitted from semiconductor laser 1 is reflected at a predetermined angle by incline surface 7 of prism 2, is transmitted through objective lens 5 toward optical disc 6, and then is focused on about 1 μm area of optical disc 6.

The laser beam focused on the information recording surface of optical disc 6 is reflected by optical disc 6 and returns through objective lens 5 toward prism 2 after its intensity is modulated depending on the size of a pit 6a having information recorded thereon. As the laser beam reflected by optical disc 6 is refracted by incline surface 7 of prism 2 and is transmitted toward first photodetector 3, a part of the laser beam is received by first photodetector 3 and the rest of the laser beam is reflected toward the upper surface of prism 2. The laser beam reflected to the upper surface of prism 2 is reflected toward a second photodetector 3a again, and as a result is received by second photodetector 3a. First and second photodetectors 3 and 3a convert the optical information into an electrical signal depending on the intensity of the laser beam which has been received. Also, first and second photodetectors 3 and 3a detect focusing and tracking errors, and then transmits them to the servo system (not shown) so as to perform focusing and tracking controls.

Since optical pickup apparatus 10 of the optical disc player according to prior art as described above includes two photodetectors 3 and 3a, two photodetectors increase the cost of the optical disc player. Also, it is the disadvantage that the laser beam reflected by optical disc 6 is reflected several times by prism 2 in order to divide the laser beam into two laser beams. Accordingly, the loss of the laser beam increases and the optic efficiency decreases.

To solve the above described problems, various efforts for providing an optical pickup apparatus comprising a prism which can be easily manufactured and which can effectively utilize the intensity of the laser beam have been tried.

U.S. Pat. No. 5,164,930 issued to Satoshi Sugiura discloses an optical pickup apparatus comprising a prism which can be easily manufactured and which can effectively utilize the intensity of laser beam. The optical pickup apparatus of Satoshi Sugiura includes a semiconductor substrate, a light-emitting device, a beam splitting device, and a light diffracting device, and can effectively utilize the intensity of the laser beam by reducing the transmission path of the beam emitted from semiconductor laser. In the optical pickup apparatus of Satoshi Sugiura, however, it is difficult to assemble two photodetectors and a light wave guiding member for guiding the diffracted beam toward the second photodetector which are disposed in the semiconductor substrate.

SUMMARY OF THE INVENTION

The present invention has been made to overcome the above described problems of the prior arts, and accordingly it is an object of the present invention to provide an optical pickup apparatus which can be easily manufactured and which can effectively utilize the intensity of laser beam.

To achieve the above object, the present invention provides an optical pickup apparatus optical disc player for reading information recorded on optical disc comprising:

a first semiconductor laser;

a laser source disposed on an upper portion of the first semiconductor laser for emitting a laser beam;

means for orienting the laser beam emitted by the laser source in a first direction toward the optical disc, orienting the reflected laser beam reflected by the optical disc and transmitted incidentally in a second direction, and producing astigmatism in the reflected beam; and a photodetector for detecting the reflected laser beam provided through, reading the information of the optical disc, and providing data so as to perform a tracking servo and a focusing servo.

Preferably, an optical pickup apparatus of the present invention further includes dividing means for dividing the laser beam emitted from the laser source into one main beam and two sub beams, which includes a diffracting grating disposed between the laser source and the orienting means.

According to one embodiment of the present invention, the orienting means includes a polygonal prism for reflecting the laser beam emitted from the laser source to the optical disc, refracting the reflected laser beam by the optical disc and providing a transmission path for the reflected beam, and a Fresnel lens for producing astigmatism in the reflected laser beam, converging and reflecting the reflected laser beam toward the photodetector.

According to another embodiment of the present invention, the orienting means includes a beam splitter for transmitting a part of the laser beam emitted from the laser source, reflecting the rest of the laser beam to the optical disc, and producing astigmatism in the reflected laser beam reflected by the optical disc, a polygonal prism for refracting the reflected beam passing through the beam splitter and providing a transmission path for the reflected beam, and a reflector for converging the refracted beam and reflecting the refracted beam to the photodetector.

The polygonal prism includes an upper surface, an incline surface, and a bottom surface, wherein the photodetector is embedded in the upper surface portion. The incline surface is disposed to be opposite to the laser source. The bottom surface is attached to the first semiconductor substrate by using an adhesive, and a Fresnel lens is disposed between the bottom surface and the first semiconductor substrate.

The Fresnel lens has an oval shape having a plain surface such that an oval ring having a saw teeth shape in cross section is concentrically arranged on another surface. The Fresnel lens is disposed on the first semiconductor substrate such that portion formed with the oval ring is embedded in the upper surface portion of the first semiconductor substrate and the plane corresponds with the upper surface of the first semiconductor substrate. The polygonal prism is attached to a plane formed by the upper surface of the first semiconductor substrate and the plain surface of the Fresnel lens using an adhesive.

The polygonal prism includes an upper surface, an incline surface, and a bottom surface, wherein the photodetector is embedded in the upper surface portion. On the incline surface a beam splitter is disposed as to be opposite to the laser source. The bottom surface is attached to the first semiconductor substrate, and the reflector is disposed between the bottom surface and the first semiconductor substrate.

In the optical pickup apparatus according to the present invention as described above, the laser beam arriving at the orienting means is reflected by the incline surface, and then proceeds through an objective lens toward the optical disc. Then, the reflected laser beam, which is reflected by the optical disc and then transmits the objective lens, transmits the incline surface and then proceeds toward the bottom surface of the orienting means. Thereafter, the laser beam is reflected again at the bottom surface of the orienting means and is detected by the photodetector. Accordingly, the optical pickup apparatus records and reproduces information on and from the optical disc and performs a focusing servo and a tracking servo of the objective lens based on the intensities of the reflected laser beam detected by the photodetector.

BRIEF DESCRIPTION OF THE DRAWINGS

The above object, and other features and advantages of the present invention will become more apparent by describing in detail preferred embodiments thereof with reference to the attached drawings, in which.

DESCRIPTION OF THE PREFERRED EMBODIMENTS

Hereinafter, preferred embodiments of the present invention will be described in detail with reference to the accompanying drawings.

Embodiment 1

Figure 1:
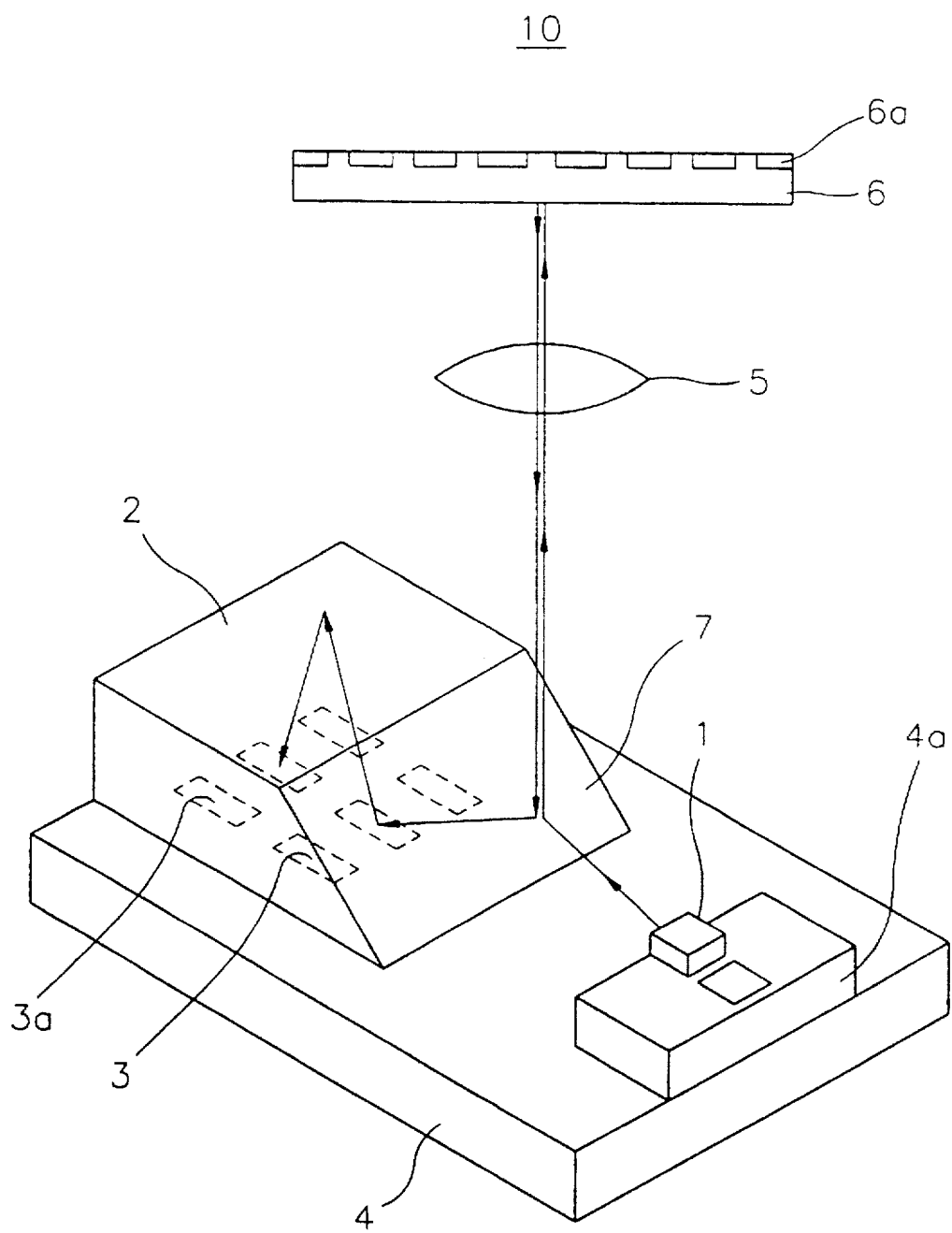
FIG. 1 is a schematic perspective view of a conventional optical pickup apparatus.
Figure 2:
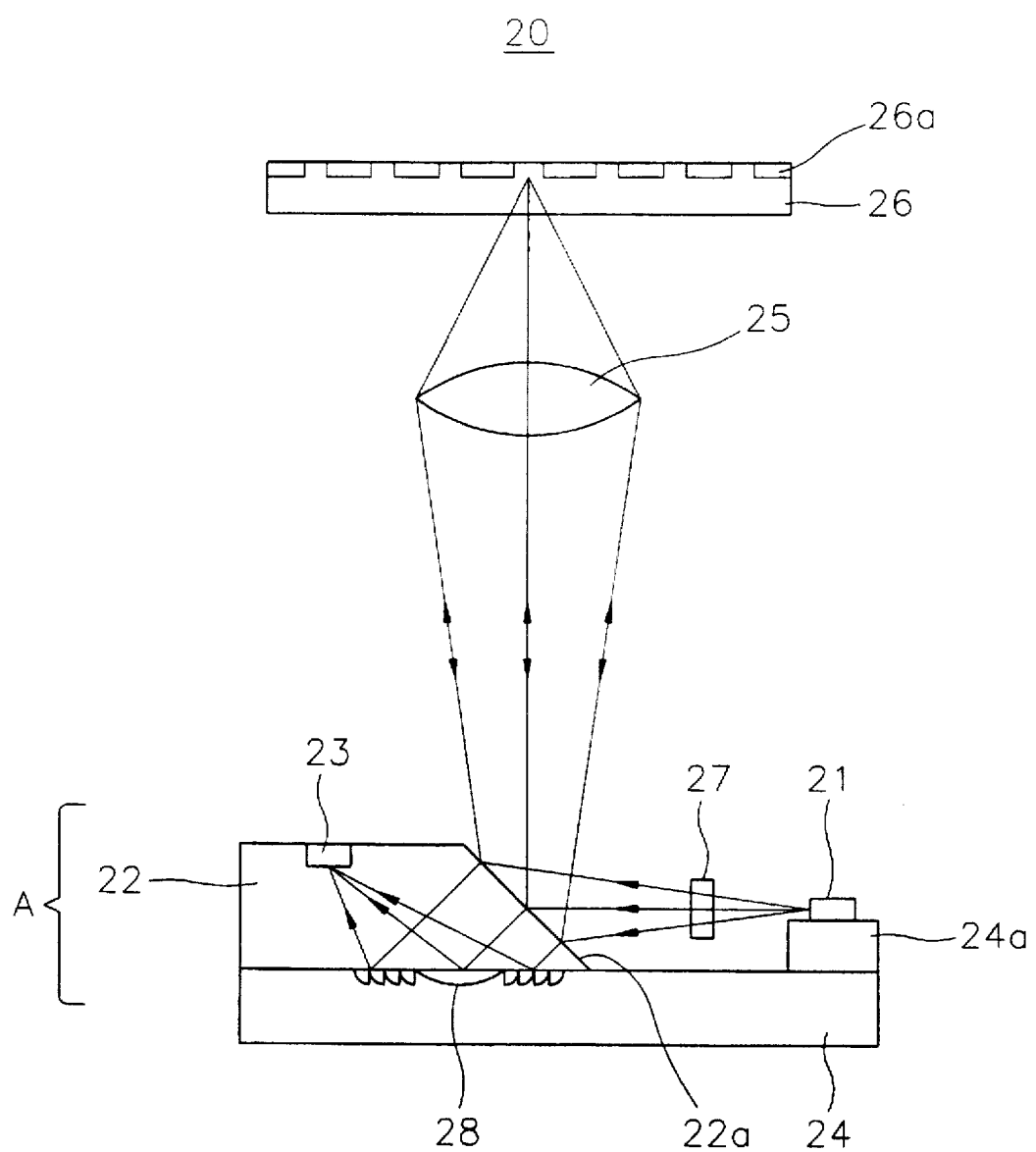
FIG. 2 is a schematic cross-sectional view of an optical pickup apparatus according to a first embodiment of the present invention.

FIG. 2 is a schematic cross-sectional view of an optical pickup apparatus according to the present embodiment. Referring to FIG. 2, an optical pickup apparatus 20 according to the present embodiment includes a first semiconductor substrate 24. A second semiconductor laser 24a as a supporting member is disposed on a portion of first semiconductor substrate 24, and a semiconductor laser 21 as a laser source is mounted on an upper surface of second semiconductor substrate 24a. On the other hand, an orienting device A is disposed on another portion of first semiconductor substrate 24. Orienting apparatus A includes a polygonal prism 22 and a Fresnel lens 28.

As shown in FIG. 2, polygonal prism 22 includes an upper surface, an incline surface, and a bottom surface. A photodetector 23 is embedded in the polygonal prism 22 at the upper surface thereof. The incline surface is disposed so as to be opposite to the laser source 21. The bottom surface of polygonal prism 22 is attached to first semiconductor substrate 24, and Fresnel lens 28 is disposed between the bottom surface and first semiconductor substrate 24.

Polygonal prism 22 reflects a laser beam emitted from semiconductor laser 21 toward an optical disc 26, and deflects the laser beam reflected by optical disc 26 so as to provide the transmitting path for the laser beam.

Fresnel lens 28 has an oval shape with a plain surface such that an oval ring having a saw teeth shape in cross section is concentrically arranged on another surface. Fresnel lens 28 is disposed on first semiconductor substrate 24 such that the portion having the oval ring is embedded in the upper surface portion of first semiconductor substrate 24 and a plane corresponds with the upper surface of first semiconductor substrate 24. Polygonal prism 22 is attached to a plane formed by the upper surface of first semiconductor substrate 24 and the plane portion of Fresnel lens 28.

Fresnel lens 28 produces astigmatism in the laser beam diffracted by polygonal prism 22, and then converges and emits (transmits) the laser beam toward photodetector 23.

Polygonal prism 22 is disposed to be opposite to semiconductor laser 21 and objective lens 25 in such a manner that one surface of polygonal prism 22 inclines in respect to an imaginary line which is in parallel with the upper surface of first semiconductor substrate 24 and traverses semiconductor laser 21 and polygonal prism 22, and in respect to a central axis of an objective lens 25.

A diffraction grating 27 is disposed between incline plane 23a of polygonal prism 22 and semiconductor laser 21, and divides the laser beam emitted from semiconductor laser 21 into three beams, for example, one main beam and two sub beams.

Furthermore, optical pickup apparatus 20 according to present embodiment comprises objective lens 25 which converges the laser beam reflected by the prism 22 onto the information recording surface of optical disc 26, and then orients the reflected laser beam reflected by the information recording surface of optical disc 26 toward polygonal prism 22.

As described above, in optical pickup apparatus 20 according to the present embodiment, semiconductor laser 21 is actuated to emit the laser beam when the servo system (not shown) provides the optical pickup with a control signal. When transmitting diffraction grating 27 disposed between semiconductor laser 21 and polygonal prism 22, the laser beam emitted from semiconductor laser 21 is divided into three beams, for example, one main beam and two sub beams, and then is reflected by polygonal prism 22, and then is oriented toward objective lens 25. The laser beam reflected by polygonal prism 22 is focused by objective lens 25 onto optical disc 26. The laser beam which has been focused on the optical disc is modulated and reflected by a pit 26a of the optical disc, and then proceeds through objective lens 25 toward polygonal prism 22.

The laser beam which has arrived at incline plane 23a and has information, is refracted at incline plane 23a, and then is oriented toward Fresnel lens 28 disposed below the bottom surface of polygonal prism 22. When the laser beam having information is reflected by Fresnel lens 28, astigmatism is produced in the laser beam. Finally the laser beam is received by photodetector 23.

Photodetector 23, which receives the laser beam having information, provides tracking and focusing error signals for the servo system (not shown) by using the three beams and the astigmatism so that servo system can perform the tracking and focusing controls.

Embodiment 2

Figure 3:
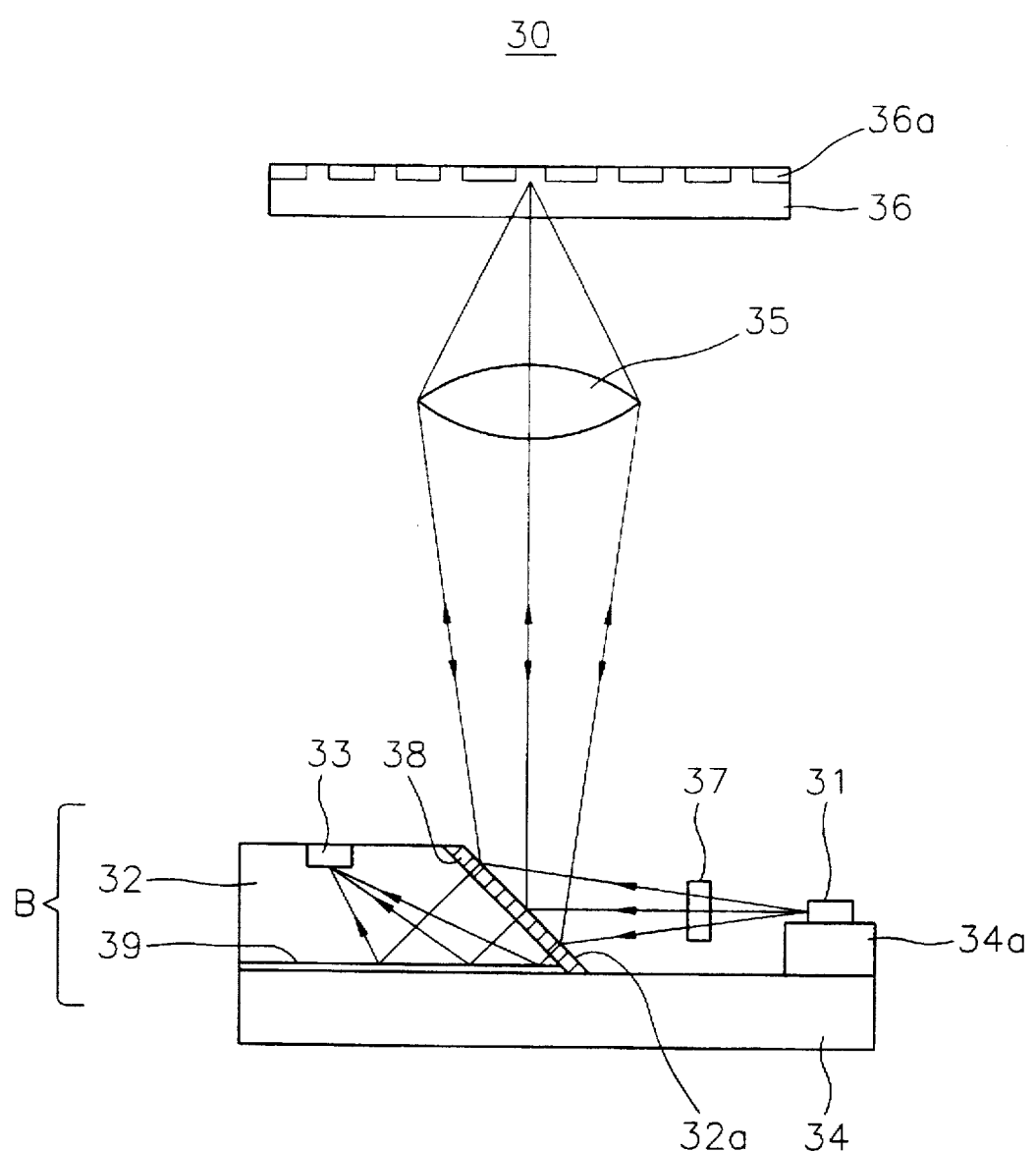
FIG. 3 is a schematic cross-sectional view of an optical pickup apparatus according to a second embodiment of the present invention.

FIG. 3 is a schematic cross-sectional view of an optical pickup apparatus according to the present embodiment. Referring to FIG. 3, an optical pickup apparatus 30 according to present embodiment includes a first semiconductor substrate 34. A second semiconductor substrate 34a as a supporting member is disposed on a portion of first semiconductor substrate 34, and a semiconductor laser 31 as a laser source is mounted on an upper surface of second semiconductor substrate 34a. On the other hand, an orienting device B is disposed apart from semiconductor laser 31 at a predetermined interval on another portion of first semiconductor substrate 34. An orienting device B includes a polygonal prism 32, a beam splitter 38, and a reflector 39.

As shown in FIG. 3, polygonal prism 32 includes an upper surface, an incline surface, and a bottom surface, and a photodetector 33 is embedded in polygonal prism at the upper surface thereof. On the incline surface, beam splitter 38 is disposed to be opposite to semiconductor laser 31. The bottom surface of polygonal prism 32 is attached to first semiconductor substrate 34, and reflector 39 is disposed between first semiconductor substrate 34 and the bottom surface of polygonal prism 32. Reflector 39 includes a reflection film.

Beam splitter 38 transmits a part of the laser beam emitted from semiconductor laser 31 while reflecting the rest of the laser beam toward an optical disc 36, and produces astigmatism in the reflected laser beam reflected by optical disc 36.

The laser beam, which has passed through beam splitter 38, is refracted by the incline surface of polygonal prism 32 and travels toward the bottom surface of polygonal prism 32. Then, the laser beam is converged and reflected by reflector 39 disposed on the bottom surface of polygonal prism 32, and then is received by photodetector 33.

A diffraction grating 37 is disposed between beam splitter 38 attached to the incline plane of polygonal prism 32 and semiconductor laser 31, and divides the laser beam emitted from semiconductor laser 31 into three beams, for example, one main beam and two sub beams.

Furthermore, optical pickup apparatus 30 according to present embodiment comprises an objective lens 35 which converges the laser beam reflected by beam splitter 38 onto the information recording surface of optical disc 36, and then orients the reflected laser beam reflected by the information recording surface of optical disc 36 toward beam splitter 38.

As described above, in optical pickup apparatus 30 according to the present embodiment, semiconductor laser 31 is actuated to emit the laser beam when the servo system (not shown) provides the optical pickup with a control signal. During transmitting diffraction grating 37 disposed between semiconductor laser 31 and prism 32, the laser beam emitted from semiconductor laser 31 is divided into three beams, for example, one main beam and two sub beams, and then is reflected by beam splitter 38 attached to the incline surface of polygonal prism 32, and then is oriented toward objective lens 35. The laser beam reflected by beam splitter 38 is focused by objective lens 35 onto optical disc 36. The laser beam focused on the optical disc is modulated and reflected by a pit 36a of optical disc 36, and then travels through objective lens 35 toward beam splitter 38.

A part of the laser beam which has arrived at incline plane 32a of beam splitter 38, which has information, is reflected and the rest of laser beam is refracted at incline plane 32a, and then is transmitted into prism 32. The laser beam having information is refracted at incline surface 32a of beam splitter 38 and is transmitted through beam splitter 38 while astigmatism is produced in laser beam due to the length difference in paths through which laser beam passes.

The laser beam having information which is incident through beam splitter 38 into polygonal prism 32, is oriented toward reflector 39 which is disposed between the bottom surface of polygonal prism 32 and first semiconductor substrate 34 such that its upper and lower surface are attached to the bottom surface of polygonal prism 32 and the upper surface of first semiconductor substrate 34, respectively.

Most of the laser beam having information is reflected by reflector 39, and then finally is received by photodetector 33.

Photodetector 33, which receives the laser beam having information, provides the tracking and focusing error signals for the servo system (not shown) so that the servo system can perform the tracking and focusing controls.

As described above, the optical pickup apparatus according to the first and second embodiments of the present invention have the advantage that they can effectively utilize the intensity of the laser beam by reducing the path of the laser beam, which entered prism by using a Fresnel lens and a reflector, and can simplify the construction of the optical pickup by reducing the number of the photodetector.

While the present invention has been particularly shown and described with reference to the particular embodiment thereof, it will be understood by those skilled in the art that various changes in form and details may be effected therein without departing from the spirit and scope of the invention as defined by the appended claims.

What is claimed is:

1. An optical pickup apparatus of an optical disc player for reading information recorded on optical disc, the optical pickup apparatus comprising:

a first semiconductor substrate;

a laser source disposed on an upper portion of the first semiconductor substrate for emitting a laser beam;

means for orienting the laser beam emitted by the laser source in a first direction toward the optical disc and for orienting a reflected laser beam which is incident after being reflected by the optical disc to allow the reflected laser beam to go forward in a second direction, the orienting means producing an astigmatism in the reflected laser beam, the orienting means including a polygonal prism for reflecting the laser beam emitted from the laser source toward the optical disc, refracting the reflected laser beam reflected by the optical disc, and providing a transmission path for the reflected laser beam, and a Fresnel lens for producing the astigmatism in the reflected laser beam and for conversing and for reflecting the reflected laser beam, wherein the polygonal prism includes an upper surface, an incline surface disposed opposite the laser source, and a bottom surface attached to the first semiconductor substrate, and the Fresnel lens is disposed between the bottom surface and the first semiconductor substrate; and a photodetector for detecting the reflected beam from the orienting means so as to read the information of the optical disc and for providing data so as to perform tracking and focusing servo operations, the photodetector being embedded in the upper surface of the polygonal prism.

2. An optical pickup apparatus as claimed in claim 1, further comprising means for dividing the laser beam into one main beam and two sub beams and for orienting said one main beam and said two sub beams toward the orienting means.

3. An optical pickup apparatus as claimed in claim 2, wherein the dividing means includes a diffraction grating disposed between the laser source and the orienting means.

4. An optical pickup apparatus as claimed in claim 1, wherein the Fresnel lens has an oval shape with a plane surface such that an oval ring having a saw teeth shape in cross section is concentrically arranged on another surface.

5. An optical pickup apparatus as claimed in claim 4, wherein Fresnel lens is disposed on the first semiconductor substrate such that a portion having the oval ring is embedded in the upper surface portion of the first semiconductor substrate and the plane corresponds with the upper surface of the first semiconductor substrate, and the polygonal prism is attached to a plane which is formed by an upper surface of the first semiconductor substrate and the plane surface of the Fresnel lens.

6. An optical pickup apparatus as claimed in claim 1, further comprising an objective lens for converging the reflected laser beam reflected by the orienting means on the information recording surface, and for orienting the reflected laser beam reflected by the information recording surface of the optical disc.

7. An optical pickup apparatus as claimed in claim 1, further comprising a supporting member disposed between the first semiconductor substrate and the laser source for supporting said laser source.

8. An optical pickup apparatus of an optical disc player for reading information recorded on optical disc, the optical pickup apparatus comprising:

a first semiconductor substrate;

a laser source disposed on an upper portion of the first semiconductor substrate for emitting a laser beam;

means for dividing the laser beam emitted from the laser source into one main beam and two sub beams;

orienting means including a polygonal prism for reflecting the laser beam emitted from the source in a first direction toward the optical disc, refracting the reflected laser beam reflected by the optical disc in a second direction, and providing a transmission path for the reflected laser beam, and a Fresnel lens for producing astigmatism in the reflected laser beam and converging and reflecting the reflected laser beam in the second direction;

an objective lens for converging the reflected laser beam reflected by the orienting means onto the information recording surface, and for orienting the reflected laser beam reflected by the information recording surface of the optical disc; and a photodetector for detecting the reflected beam provided through the orienting means, reading the information of the optical disc, and providing data so as to perform tracking servo and focusing servo, wherein the dividing means includes a diffraction grating disposed between the laser source and the orienting means, the polygonal prism includes an upper surface, an incline surface disposed to be opposite to the laser source, and a bottom surface attached to the first semiconductor substrate, the photodetector is embedded in the polygonal prism at the upper surface thereof, and the Fresnel lens is disposed between the bottom surface and the first semiconductor substrate.

9. An optical pickup apparatus as claimed in claim 8, wherein the Fresnel lens has an oval shape with a plain surface such that an oval ring having a saw teeth shape in cross section is concentrically arranged on another surface, and is disposed on the first semiconductor substrate such that a portion with the oval ring is embedded an the upper surface portion of the first semiconductor substrate and the plane corresponds with the upper surface of the first semiconductor substrate, and the prism is attached to a plane formed by an upper surface of the first semiconductor substrate and the plain surface of the Fresnel lens.

10. An optical pickup apparatus as claimed in claim 8, further comprising a supporting member disposed between the first semiconductor substrate and the laser source for supporting said laser source.

* * * * *